Dec. 19, 1933. J. O. GOODWIN 1,939,894
METHOD AND APPARATUS FOR MAKING CORED ARTICLES OF PLASTIC MATERIAL
Filed March 22, 1928
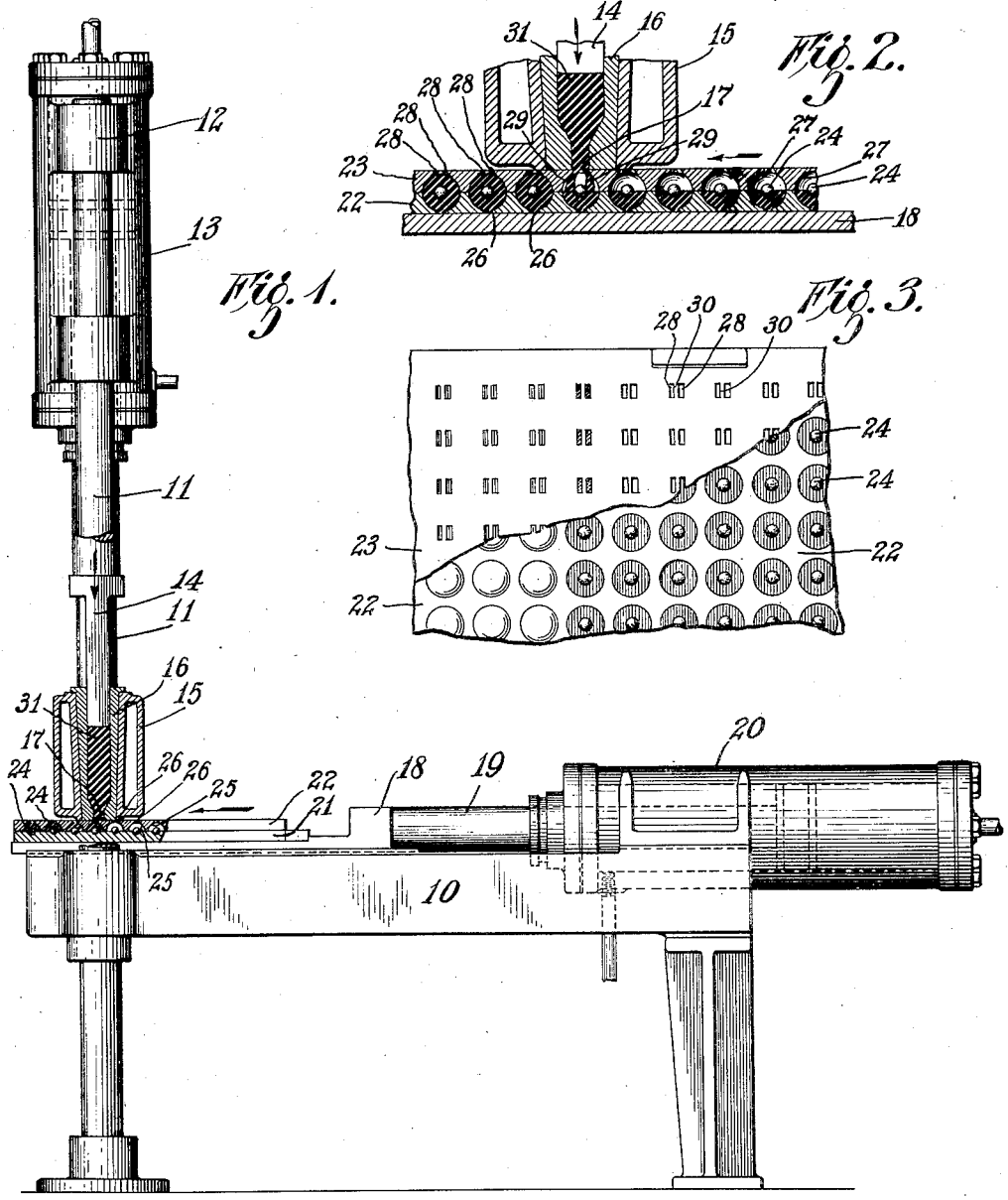
Inventor
John O. Goodwin
By Pivison, Eskin & Avery
Attys.

Patented Dec. 19, 1933

1,939,894

UNITED STATES PATENT OFFICE 1,939,894

METHOD AND APPARATUS FOR MAKING CORED ARTICLES OF PLASTIC MATERIAL

John O. Goodwin, Akron, Ohio, assignor to The B. F. Goodrich Company, New York, N. Y., a corporation of New York Application March 22, 1928. Serial No. 263,684

7 Claims. (Cl. 18—30)

This invention relates to methods and apparatus for making articles of plastic material having respective core-members embedded therein, the example chosen for purposes of illustration herein being that of a rubber golf ball provided at its center with a sphere of metal or other suitable material to give it the desired weight.

My general objects are accuracy and economy in the manufacture of such articles. A more specific object is to provide for molding about a core member a plastic body completely enclosing the core without requiring the withdrawal of core supporting means from the plastic mass after the molding of the latter has been substantially completed, as has been necessary where the core is supported at a fixed position in a mold while the mold is filled by a single inflow of stock.

Of the accompanying drawing:

Fig. 1 is an elevation, with parts sectioned and broken away, of apparatus embodying and adapted to carry out my invention in its preferred form and illustrating a first stage of operation.

Fig. 2 is a vertical section of parts of the apparatus illustrating a later stage of the operation.

Fig. 3 is a plan view of parts of the apparatus shown in Fig. 2, a part being broken away.

Referring to the drawing, the apparatus comprises a table 10 of which one end is supported by a pair of tie rods 11, 11 rising from the floor through apertures in the table and connected at their upper ends, over the table, by a cross-member or press-head 12 formed at its middle as a fluid-pressure cylinder 13. The downwardly projecting piston-rod of the said cylinder has secured thereon a plunger 14 adapted slidably to fit in an extrusion chamber or discharge device which comprises a steam-jacket casting or die-box 15 and a lining 16 therein, the said lining defining at its lower end a narrow extrusion or die aperture 17.

The upper face of the table 10 is formed with a guide-way for a reciprocable slide 18 secured on the outer end of the piston-rod 19 of a fluid-pressure cylinder 20 which is mounted upon the table, the slide 18 being adapted to carry successive mold assemblies, such as the core-supporting member 21 and the mold section 22 (Fig. 1) or the mold section 22 and a complementary mold section 23 (Figs. 2 and 3), under the die-box assembly 15, 16 in stock-receiving relation to the die aperture 17 thereof.

The core-supporting member 21 is formed in its upper face with spaced apart hemispherical recesses adapted snugly to seat the respective spherical core-members 24, 24 of the balls to be molded and the mold section 22 is formed on one face with hemispherical mold cavities 25, 25 registrable with the core-seating recesses of the member 21 and each communicating with the opposite face of the mold section through a small stock-receiving aperture 26.

The mold section 23 is formed on one face with hemispherical mold cavities 27, 27 registrable and complemental with relation to those of the mold section 22 and each communicating with the opposite face of the mold section through a pair of symmetrically disposed stock-receiving slots 28, 28 which are separated by a web 30 and diverge from each other from their outer ends toward the mold cavity so that respective streams of stock 29, 29 (Fig. 2) passing through them from the die aperture 17 will be received on opposite sides of a core 24 embedded in a mass of plastic material occupying the cavity of the mold section 22 and such reception of the stock will result in a filling of the mold cavity without the development of any strong unbalanced or disturbing force against the core.

In the operation of the apparatus one of the mold sections 22 is associated with the core-supporting member 21 having a set of the cores 24 mounted in the respective recesses thereof and the assembly is mounted upon the slide 18 as shown in Fig. 1 and the assembly is passed through under the die-box structure 15, 16 by means of the cylinder 20 while a charge of plastic material 31 in the die-box is so held under compression by means of the plunger 14 and its cylinder 13 as to cause the plastic material to be so extruded through the die aperture 17 and the successive apertures 26 of the mold section as to fill the hemispherical cavities of the mold section and compact the stock about the cores therein and shear off the several units of stock from the supply mass 31 at the mouths of the apertures 26. In the case of rubber articles the stock is kept warm and highly plastic in the die-box by circulation of steam through the member 15.

The force upon the plunger 14 is relieved as the slide approaches the end of its movement, the mold section 22 and the core-supporting member 21 are removed from the slide and the slide is returned to its starting position. The mold section 22 with the stock therein is then separated from the core-supporting member, the cores remaining embedded in the stock, which cools and thus becomes stiffer, in the case of a rubber composition, and so provides a strong support for the cores embedded therein. The mold section 22 is placed in inverted position upon the slide and the mold section 23 is placed upon the section 22 as shown in Figs. 2 and 3 and the assembly is forced through under the die-box while the plunger 14 is again urged downward, which causes the cavities of the mold section 23 to be filled and the stock sheared off at the mouths of the slots 28, the stock accumulating in the cavities and being unified with that in the cavities of the lower mold section 22, to form complete spheres, without disturbing the cores.

The spherical masses, in the case of rubber balls, preferably are then vulcanized by subjecting the mold assembly to suitable heat and pressure, after which they are removed from the mold and finished by removing the mold-fins or projections consisting of the stock contained in the apertures 26 and 28. I do not wholly limit my claims, however, to the formation of rubber balls or to subjecting the spherical masses of plastic stock to any further treatment in the mold after they have been formed therein.

Modifications are possible within the scope of my invention as defined in the appended claims.

I claim:

1. The method of molding a cored article which comprises molding a portion of the article about the core and against a support while the core is mounted upon an indirect contact with the support, removing the said portion of the article and the core from the support as a unit and thereafter molding the rest of the article about the core and against the first molded portion of the article while the core is supported wholly by contact with the first-molded portion.

2. The method of molding a cored article of plastic material which comprises molding a portion of the article against the core and then molding a second portion of the article against the core while the core is supported solely by contact with the first-molded portion, the material of the second molded portion being caused to accumulate about the core by substantially symmetrical extrusion from an adjacent supply mass to opposite sides of the core while the assembly is moved past the supply mass.

3. The method of molding a series of cored articles which comprises supporting a series of cores wholly by contact with respective molded portions of the articles and while so supporting them passing them as a series past a supply mass of stock while holding the supply mass under pressure and thereby extruding stock therefrom onto the cores in succession and molding the stock about the cores.

4. A method as defined in claim 3 in which the stock from the supply mass is caused to accumulate about each core by substantially symmetrical flow from the supply mass to opposite sides of the core.

5. Molding apparatus comprising a pair of mating mold members adapted to define a molding cavity between them, each of the said members being formed with a passage leading from its outer face to the said cavity, means for movably supporting the said members in mated relation and closing the said passage of one of the members and means for extruding a plastic through the passage of the other member into the said cavity as the two members in mated relation are moved past the extruding means.

6. Molding apparatus comprising a mold member formed in one face with a molding cavity having communication with the opposite face of the member through a plurality of passages in the member symmetrically disposed with relation to the cavity, means adapted to fit against the first mentioned face of the mold member substantially to close that side of the cavity, and means for filling the cavity with stock from the second mentioned face of the mold member, through the said passages.

7. Molding apparatus as defined in claim 6 in combination with means for moving the mold member past the filling means in stock-receiving relation thereto to effect the mold filling by such movement.

JOHN O. GOODWIN.